United States Patent [19]

Reasland

[11] Patent Number: 4,492,056
[45] Date of Patent: Jan. 8, 1985

[54] BODY GRIPPING ANIMAL TRAP STAND WITH TRIGGER

[76] Inventor: Russell R. Reasland, R.R. 2, Creston, Iowa 50801

[21] Appl. No.: 496,446

[22] Filed: May 20, 1983

[51] Int. Cl.³ .............................................. A01M 23/26
[52] U.S. Cl. ............................................. 43/96; 43/93
[58] Field of Search .................. 43/96, 88, 91, 92, 93, 43/58

[56] References Cited

U.S. PATENT DOCUMENTS

| | | | |
|---|---|---|---|
| 2,741,065 | 4/1956 | Oberto | 43/93 |
| 3,973,252 | 8/1976 | Souza | 43/92 |
| 3,974,592 | 8/1976 | Staats | 43/96 |
| 4,000,578 | 1/1977 | Souza | 43/92 |
| 4,152,861 | 5/1979 | Miller | 43/96 |
| 4,267,660 | 5/1981 | Kieihorn | 43/96 |
| 4,411,091 | 10/1983 | Hedstrom | 43/96 |

Primary Examiner—Gene P. Crosby
Attorney, Agent, or Firm—Zarley, McKee, Thomte, Voorhees & Sease

[57] ABSTRACT

The present device is an improved stand and trigger mechanism for a body gripping trap, having first and second rectangular frames which are pivotally mounted to each other for pivotal movement about a horizontal axis from a set position to a sprung position. Springs yieldably bias the frames from the set position to the sprung position. The rectangular frames each have a horizontal member, and the horizontal members of the two frames are in adjacent spaced relation to one another when the frames are in the set position. The horizontal members move away from one another as the frames move from the set position to the sprung position. The release mechanism comprises a trigger frame positioned between the horizontal members, and a pair of trigger arms mounted to the trigger frame for pivotal movement about a horizontal axis. Each of the trigger arms has a shoulder facing the trigger frame and being movable from a catch position wherein the shoulders of the two trigger arms retentively embrace the horizontal frame members therebetween and hold the frame members in a set position to a release position wherein the shoulders move out of retentive engagement with the horizontal frame members and free the frame members for movement to their sprung position.

9 Claims, 5 Drawing Figures

BODY GRIPPING ANIMAL TRAP STAND WITH TRIGGER

BACKGROUND OF THE INVENTION

This invention relates to an improved stand and trigger mechanism for a conventional body grasping trap.

Conventional body grasping traps comprise a pair of rectangular frames which are pivotally mounted with respect to one another. The frames include horizontal members which are movable from a catch position wherein the two horizontal members are adjacent but spaced from one another, to a sprung position, wherein the two horizontal members spread apart from one another. Spring means urge the two rectangular frames from their catch position to their sprung position.

Various types of trigger mechanisms have been utilized for holding the rectangular frames in their set position and for releasing the frames so that they can spring to their sprung position. Currently known trigger mechanisms have several deficiencies. They are not reliable in the manner in which they release the trap, and on many occasions the animal will engage the trigger mechanisms without springing the trap. Currently known trigger mechanisms are also difficult to set without placing the hands of the operator in jeopardy of becoming grasped or injured by the members of the trap. Another disadvantage of current trigger mechanisms for this type of trap is that they are not easily set at the desired location. Oftentimes it is desirable to place these traps at various levels above the ground, and presently known devices do not provide simple means for setting the trap at the desired height above the ground.

Another disadvantage of conventional trigger mechanisms for this type of trap is that the trigger mechanisms do not hold the trap in an upright position. Instead, it is necessary to wedge sticks in the jaws to hold the jaws in place in an upright position. However, these sticks are easily sighted by thieves, and theft of the traps often results.

Presently known stands for this type of trap usually can be used for only one particular size of trap. A different trap stand is necessary if a different size trap is used.

Another disadvantage of conventional trap stands is that they can only hold the trap in one position. However, it is often desirable to set the trap in various positions including upside down, right side up, and at various heights.

The trigger mechanisms of conventional devices often hang down in the center of the trap. Some animals, especially raccoons, will not go through the trap when there is something hanging in the center thereof. Smaller animals such as mink, may pass through the trap without touching the trigger if it is suspended in the middle of the trap. It is therefore desirable to have a trap which does not have the trigger mechanism suspended in the center of the trap.

Trappers, in an effort to preserve their traps, often wax the traps so as to protect them from the elements. Often with the body gripping traps, waxing results that the traps go off too easily. It is therefore desirable to be able to wax the trap without causing it to be triggered too easily.

Therefore, a primary object of the present invention is the provision of an improved body grasping trap stand and an improved trigger mechanism for this type of trap stand.

A further object of the present invention is the provision of a trigger mechanism which is reliable and which is sensitive to the touch of the animal when the animal encounters the trap.

A further object of the present invention is the provision of a trigger mechanism for this type of trap which permits the trap to be set quickly and easily without placing the hands of the operator in jeopardy of being injured.

A further object of the present invention is the provision of a trap stand and trigger mechanism which permits the body grasping trap to be set at the desired height above the ground.

A further object of the present invention is the provision of a trap stand and trigger mechanism which can be quickly and easily anchored to the ground at the desired location.

A further object of the present invention is the provision of a trigger mechanism which will not become easily damaged or broken throughout use.

A further object of the present invention is the provision of a trigger mechanism which can be easily repaired in the event of damage during use.

A further object of the present invention is the provision of a device that holds the trap solidly in any position with no additional bracing being required, so that if an animal hits the trap, it will not knock the trap out of position or upset the trap.

A further object of the present invention is the provision of a trap stand which will fit traps of various sizes, thereby eliminating the need to have different sized trap stands for each size of trap.

A further object of the present invention is the provision of a triggering apparatus which will trigger the trap whenever small animals crawl over the trigger bar, thereby catching animals which would otherwise fail to touch the conventional wishbone type of trigger which is suspended in the middle of the trap.

A further object of the present invention is the provision of a trap stand which permits the trap to be set in any position and with the stand on any slope of ground.

A further object of the present invention is the provision of a triggering device for the trap which does not block or interfere with the trap opening, so that animals are less fearful of going through the trap.

A further object of the present invention is the provision of a trap stand which permits the trap to be waxed so that it will operate faster and last longer.

A further object of the present invention is the provision of a triggering device for the trap stand which can be filed to different angles so as to adjust the ease with which the trap is set off.

A further object of the present invention is the provision of a trap stand which is made of steel so that it can be dyed to blend in with the surrounding environment around the trap.

A further object of the present invention is the provision of a trap stand which will be less visible to thieves than the prior trap stands which were supported by sticks and boards.

A further object of the present invention is the provision of a trap stand and trigger which permits the animals to be caught and killed instantly so as to minimize the thrashing aound of the animal.

A further object of the present invention is the provision of a trap stand which permits the stand to be raised several inches so as to let the smaller animals pass under the trap stand, and which can be mounted in a lower position so as to catch smaller animals when desired.

A further object is the provision of a trap stand which can be utilized with the trigger mechanism of the present invention or which can be used with a conventional wishbone trigger depending upon the choice of the trapper.

A further object of the present invention is the provision of a device which is economical to manufacture, durable in use and efficient in operation.

SUMMARY OF THE INVENTION

The present invention utilizes a trap stand and trigger mechanism for conventional rectangular body grasping traps. The trap stand comprises a U-shaped frame having two downwardly extending tines and a cross member extending between the upper ends of the tines. Pivotally mounted to the cross member are a pair of trigger arms, each of which have an inwardly presented shoulder for engaging the horizontal members of the rectangular trap frame. The trigger arms are pivotal to a catch position wherein two of the horizontal frame members of the rectangular frame are grasped between the two spaced apart shoulders of the trigger arms. The trigger arms include horizontal trip bars which are positioned so as to be engaged by the animal when the animal is passing through the rectangular frame of the trap. These trip bars cause the trigger arms to release the horizontal frame members of the rectangular trap frame, thereby permitting the trap frame to spring from its set position to its sprung position.

The present invention also utilizes a horizontal plate which is positioned between the two horizontal members of the rectangular trap frame. This horizontal plate includes a pair of outwardly facing fingers which engage the horizontal members and limit the movement of the horizontal members toward one another. Each horizontal member is embraced between one of the fingers on the centrally located plate and one of the shoulders of the trigger arms. The plate of the present invention permits the rectangular frame to be mounted on the trap stand in such a manner that it is securely attached to the trap stand and will not fall or tilt.

The vertical tines of the trap stand are adapted to be pierced into the ground so as to permit the trap stand to be anchored to the ground at a height which is desirable for the particular animal being trapped. The trapper can place the trap stand completely into the soil as shown in FIG. 1 or the trapper can elevate the stand slightly so that only the lower portions of the tines protrude within the soil. The trap also provides positive but sensitive grasping of the trap when it is in its set position. The grasping is sensitive to the animal's touch so as to release the trap and permit it to spring from its catch position to its sprung position.

DETAILED DESCRIPTION OF THE PREFERRED EMBODIMENT

Figure 1:
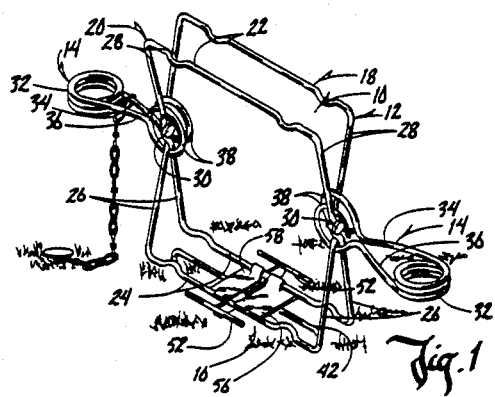
FIG. 1 is a perspective view of the present invention with the trap stand being anchored to the ground.

Referring to the drawings, numeral 10 generally designates a rectangular body gripping trap of the present invention. Trap 10 comprises a rectangular frame assembly 12, a pair of spring assemblies 14 and a trigger trip stand assembly 16. Rectangular frame assembly 12 comprises two rectangular frames 18, 20 each of which includes an upper horizontal member 22, a lower horizontal member 24, and two spaced apart vertical side members 26, 28. At the approximate midpoint of vertical side members 28, is a pivot pin 30 which pivotally interconnects the two rectangular frames 18, 20 for pivotal movement about a horizontal axis.

Each spring assembly 14 includes a spring coil 32 and a pair of spring arms 34, 36 which are spring biased away from one another. At the ends of each spring arm 34, 36 is a circular ring 38. Rings 38 surround the junctures provided by pivot pins 30 and are positioned between vertical upstanding members 26, 28 as shown in FIG. 1. The spring bias of arms 34, 36 away from one another causes the rectangular frames 18, 20 to be yieldably urged from their set position shown in FIG. 1 to a sprung position wherein each of the frames 18, 20 have rotated approximately 90° with respect to one another. In this sprung position, horizontal member 22 of frame 18 is located adjacent horizontal frame member 24 of rectangular frame 20 and similarly, horizontal frame member 22 of rectangular frame 20 is positioned adjacent horizontal frame member 24 of rectangular frame 18.

The trigger trip stand assembly 16 is adapted to grasp and support the rectangular frame assembly 12 in its set position. Trip stand assembly 16 comprises a U-shaped frame having two spaced apart vertical tines 40 which are joined adjacent their upper ends by a horizontal rod 42.

Pivotally mounted on horizontal rod 42 are a pair of trigger arms 44, 46. Each trigger arm 44, 46 includes an inner end 48 which is pivotally mounted to rod 42, and an outer end 50.

Welded or otherwise attached to outer ends 50 of trigger arms 44, 46 are a pair of horizontal trip bars 52. Each arm 44, 46 also includes an inwardly presented shoulder 54 which faces inwardly towards rod 42. Trigger arms 44, 46 are adapted to move from their catch position shown in FIG. 3 to their release position shown in FIG. 5. In the catch position, the inwardly presented shoulders 54 retentively embrace the outside edges of horizontal members 24 of rectangular frames 18, 20. Because members 24 are spring biased away from one another, they frictionally engage the inwardly presented shoulders 54 and are held against further outward movement by their retentive engagement with shoulders 54.

Figure 5:
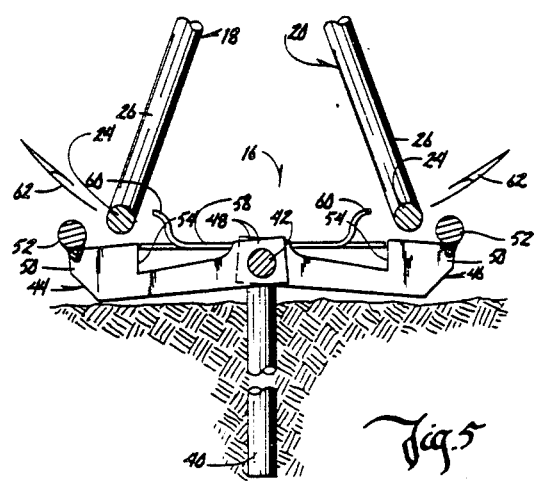
FIG. 5 is a view similar to FIG. 3, but showing the trigger mechanism in its released position.

However, whenever an animal accidentally bumps against or engages the bars 52, he causes the trip arms 44, 46 to drop downwardly to their release position shown in FIG. 5. This permits the spring biased horizontal members 24 to spring away from one another from their set position to their sprung position.

Welded or otherwise operably attached to the upper surface of horizontal rod 42 are a pair of horizontal plates 56, 58. Each plate 56, 58 includes a pair of outwardly facing fingers 60 which face and are adapted to retentively engage horizontal members 24 of rectangular frames 18, 20. Each finger 60 is curved upwardly and outwardly so as to engage horizontal members 24 and so as to extend above horizontal members 24. Fingers 60, however, do not block the movement of horizontal members 24 outwardly in the direction indicated by the arrows 62 in FIG. 5.

Figure 2:
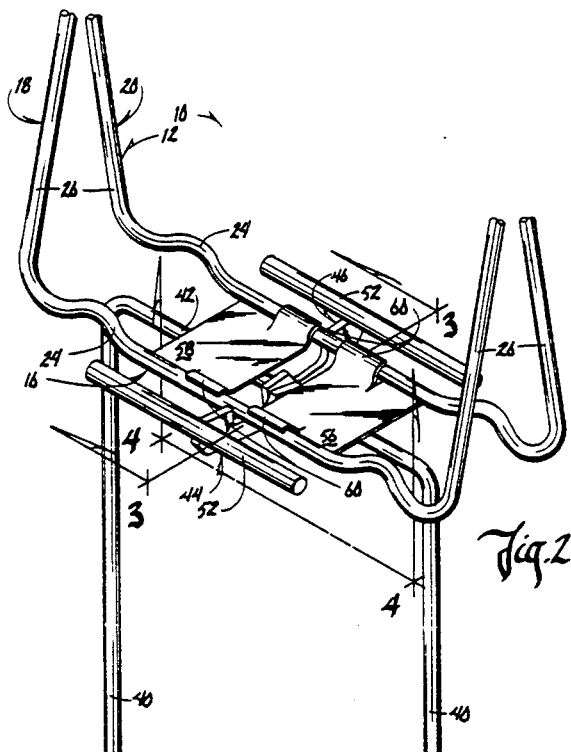
FIG. 2 is an enlarged perspective view of the present invention showing the trap stand before it has been anchored to the ground.
Figure 3:
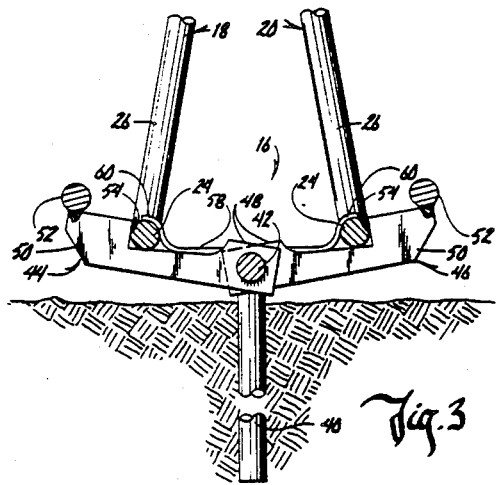
FIG. 3 is a sectional view taken along line 3—3 of FIG. 2.
Figure 4:
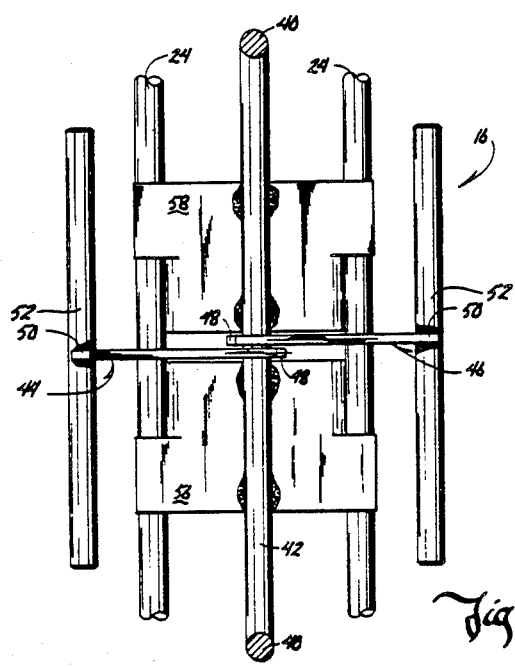
FIG. 4 is a sectional view taken along line 4—4 of FIG. 2.

As can be seen in FIG. 3, when the rectangular frames 18, 20 are in their set position, each horizontal member 24 is retentively embraced between fingers 60 and inwardly presented shoulders 54. This arrangement permits the fingers 60 and the inwardly presented shoulders 54 to retentively hold the rectangular frame assembly 12 in the position shown in FIGS. 1 and 2. The frame assembly 12 is held securely so that it will not tilt or lean.

To set the trap, it is merely necessary for the operator to force the rectangular frames 18, 20 into the position shown in FIGS. 1–3 against the bias of spring assemblies 14. The frames are moved until the horizontal members 24 engage and are limited by the fingers 60. Then trigger arms 44, 46 are lifted upwardly to their catch position as shown in FIG. 3. In this position the trap is held in a vertically disposed position, and is ready to spring to its sprung position the moment an animal encounters horizontal bars 52.

The tines 40 can be inserted into the ground to the desired depth. In FIG. 1, they are shown completely inserted into the ground so that the trap rests with horizontal members 24 contiguous to the ground. However, it is possible to elevate the device merely by lifting the tines up until the horizontal rod 42 is the desired distance above the ground. Different heights may be desirable for different types of animals and for different types of locations.

When the present invention is used, the trap can be supported in an upright position much more easily than with conventional trap stands. Since there is no need for sticks or boards to hold the trap in place, the trap is less visible, and therefore less likely to attract the attention of thieves.

While there are numerous trap stands on the market that will hold this type of trap, most of them can only be used for a particular size trap. The present invention will hold traps of any size, and therefore can be utilized for any of a number of different sized traps. The device holds the trap in such a way that it the trap can be set in any position, i.e., upside down, on its side, or right side up.

With conventional wishbone type triggers, some animals, especially raccoons, will not go through the trap. Also, small animals, such as mink, will pass by the wishbone trigger and not be caught. With the present invention, the animal's belly sets off the trap as they crawl over the bar of the trigger and the jaws of the trap.

It is possible to use the trap stand without using the trigger. In such a case, the trap stand is used and a conventional trigger is used in combination with it. This is an option which is not available with other types of stands. The adjustability of the height of the trap is also advantageous. Early in the season, the trapper can raise the trap up and let the small animals which have not yet reached their prime go under the trap, while at the same time permitting larger animals to be caught by the trap. Later on in the season, the stand would be pushed down lower so as to catch the small animals and still catch the larger ones.

Another advantage of the present invention is that the trap can be waxed so as to make them work faster and last longer. With conventional triggering devices, the use of wax causes the trigger to be too sensitive and to go off too easily.

Thus, it can be seen that the device accomplishes at least all of its stated objectives.

What is claimed is:

1. An improved release mechanism for a body grasping trap comprising first and second rectangular frames pivotally mounted to each other for pivotal movement about a horizontal axis from a set position to a sprung position, spring means yieldably biasing said frames from said set position to said sprung position, said rectangular frames each having a horizontal member, said horizontal members being in adjacent spaced relation to one another when said frames are in said set position, said horizontal members moving away from one another as said frames move from said set to said sprung position: said release mechanism comprising:

a first trigger frame member positioned between said horizontal members when said rectangular frame members are in said set position;

a pair of trigger arms mounted to said trigger frame for pivotal movement about a horizontal axis; each of said trigger arms having a shoulder facing said trigger frame and being movable from a catch position wherein said shoulders of said two trigger arms retentively embrace said horizontal frame members therebetween and hold said frame members in said set position to a release position wherein said shoulders move out of retentive engagement with said horizontal frame members and free said frame members for moving to said sprung positon;

said trigger frame comprising a horizontal rod extending parallel to said horizontal frame members, said trigger arms being pivotally mounted for pivotal movement around the longitudinal axis of said rod;

said horizontal rod including downwardly extending tines connected thereto for penetrating the ground and supporting said rod.

2. An improvement according to claim 1 and further comprising a trigger bar attached to each of said trigger arms, said trigger bar extending at least partially above said horizontal frame members when said frames are in said set position.

3. An improvement according to claim 2 wherein said trigger bars are approximately parallel to said horizontal frame members when said frames are in said set position.

4. An improvement according to claim 1 wherein said trigger frame comprises spaced apart first and second finger members, each of which is in engagement with one of said horizontal members when said horizontal members are in said set position so as to limit movement of said horizontal members toward one another.

5. An improvement according to claim 4 wherein each of said finger members extends at least partially above one of said horizontal members when said horizontal members are in said set position.

6. An improvement according to claim 1 wherein at least one horizontal plate is attached to said rod and extends horizontally radially outwardly from said rod to terminate in a pair of opposite side edges, said side edges engaging said horizontal members to limit inward movement of said horizontal members when said horizontal members are in said set position.

7. An improvement according to claim 6 wherein each of said side edges is in close spaced relation with one of said shoulders of said trigger arms so as to embrace one of said horizontal members therebetween when said horizontal members are in said set position.

8. An improvement according to claim 7 wherein each of said side edges extends at least partially above said horizontal members so as to limit upward movement of said horizontal members with respect to said horizontal rod.

9. An improvement according to claim 8 wherein a portion of said horizontal plate engages the under surface of said horizontal members to limit downward movement of said horizontal members with respect to said plate.

* * * * *